Figure 1:
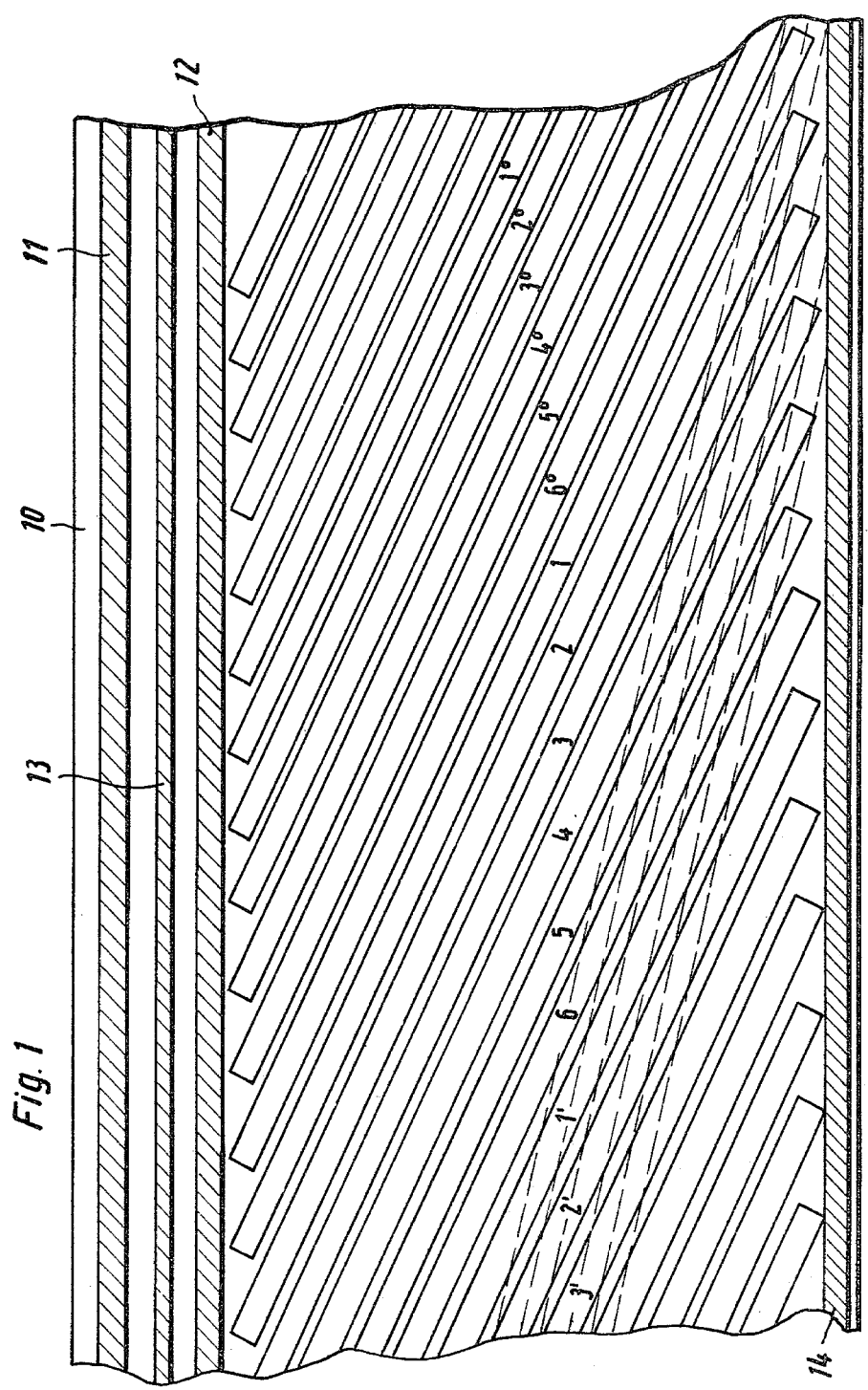

United States Patent [19]

Heitmann et al.

[11] 4,293,879

[45] Oct. 6, 1981

[54] METHOD AND APPARATUS FOR THE VARIABLE SPEED REPRODUCTION OF A VIDEO SIGNAL STORED ON MAGNETIC TAPE

[75] Inventors: Jürgen Heitmann, Seeheim; Hans-Peter Maly, Darmstadt; Rudolf Wilhelm, Büttelborn, all of Fed. Rep. of Germany

[73] Assignee: Robert Bosch GmbH, Stuttgart, Fed. Rep. of Germany

[21] Appl. No.: 75,978

[22] Filed: Sep. 17, 1979

[30] Foreign Application Priority Data

Sep. 26, 1978 [DE] Fed. Rep. of Germany ....... 2841728

[51] Int. Cl.³ .............................................. H04N 5/78
[52] U.S. Cl. ...................................... 360/10; 360/37; 360/38; 360/72.2
[58] Field of Search ................. 360/9, 10, 72.2, 38, 360/33, 37, 72.3, 73; 358/127, 138, 148

[56] References Cited

U.S. PATENT DOCUMENTS

| | | | |
|---|---|---|---|
| 3,683,992 | 8/1972 | Farr | 360/10 |
| 4,139,867 | 2/1979 | Foerster | 360/9 |
| 4,175,267 | 11/1979 | Fachi | 358/147 |
| 4,189,758 | 2/1980 | Morio | 360/10 |
| 4,210,938 | 7/1980 | Heitmann et al. | 360/10 |

FOREIGN PATENT DOCUMENTS

| | | | |
|---|---|---|---|
| 1487004 | 4/1965 | Fed. Rep. of Germany | 360/10 |
| 2725365 | 12/1978 | Fed. Rep. of Germany | 360/10 |
| 1536376 | 12/1978 | United Kingdom | 360/10 |

*Primary Examiner*—James W. Moffitt
*Assistant Examiner*—Alan Faber
*Attorney, Agent, or Firm*—Frishauf, Holtz, Goodman & Woodward

[57] ABSTRACT

This invention concerns a method of reproducing, at a selectable magnetic tape speed different from that used during the recording, a video signal stored in a plurality of separate tracks inclined to the center line of the magnetic tape by means of a head wheel carrying peripherally arranged magnetic heads, wherein the addresses of reproduced lines of picture information are derived solely from the composite signal reproduced from the magnetic tape, wherein useful lines are read into respective locations of a picture store in accordance with these line addresses, and wherein the stored lines are read out from the store in a predetermined sequence.

In the embodiment described the line addresses are derived by a counter to the counting input of which are delivered pulses which correspond to that of the horizontal synchronizing pulses taken from the magnetic tape, to the resetting input of which are delivered pulses which correspond to the vertical synchronizing pulses taken from the magnetic tape, and to a third input of which are delivered pulses the frequency of which corresponds to the frequency of cross modulation disturbances and each of which causes a change in the registered count by an amount which is determined by the registered count itself and whether the tape reproduction speed is greater or less than the recording speed.

12 Claims, 3 Drawing Figures

METHOD AND APPARATUS FOR THE VARIABLE SPEED REPRODUCTION OF A VIDEO SIGNAL STORED ON MAGNETIC TAPE

This invention relates to method and apparatus for the reproduction of a video signal stored on magnetic tape.

In our U.K. Patent Specification No. 1 536 376 there is described a method for the fast or slow motion reproduction of video signals recorded by the helical scan technique in individual oblique tracks upon a magnetic tape, the magnetic tape being moved at a speed sufficiently different from that used in the recording that during the reproduction the scanning paths of the magnetic heads do not coincide with the recorded tracks. In this method temporary storage is effected of those portions of the reproduced signals which satisfy predetermined conditions concerning sufficiency of picture information, the temporarily stored signals being read out from storage according to a desired television standard.

In the practical performance of the above method we have found that the proposed criteria for detecting the signals meriting storage, namely their amplitudes, or in carrier frequency recorded signals the amplitude of the carrier frequency, are not always adequate. As a consequence of the small clearance between each two adjacent recorded tracks upon the magnetic tape, the amplitude of the reproduced signals upon transition from one track to the next falls by such a small magnitude that these breaks cannot be detected with sufficient reliability. On the other hand the addressing of each line would involve a substantial capital outlay on circuitry even when performed at the recording stage.

In our more recent U.S. Patent Application Ser. No. 908,930, which matured on July 1, 1980 into U.S. Pat. No. 4,210,938 and correspond to German Patent Application No. P 27 25 365.2, there is therefore proposed a method and circuit arrangement for the reproduction, at a tape speed which is selectively different from that of the recording, of video signals stored in individual oblique tracks wherein the magnetic head wheel rotates at substantially the same nominal rpm for all selectable tape speeds, and wherein line addresses are synthesized from the instantaneous positions of the head wheel and the magnetic tape. By the use of these line addresses the contents of the usable picture lines are read into an intermediate picture store and are read out therefrom according to a predetermined reading programme to give the television standard desired. This method operates satisfactorily in practice, particularly because signal portions with usable picture content are reliably recognised. Moreover these signal portions can, without preliminary addressing, be read into correct addresses in the intermediate store and can be read out therefrom in accordance with the predetermined television standard.

Nevertheless, this method requires a substantial capital outlay on mechanical devices and circuitry for determining the head wheel and tape positions.

Accordingly, the present invention provides a method of reproducing, at a selectable magnetic tape speed different from that used during the recording, a video signal stored in a plurality of separate tracks inclined to the center line of the magnetic tape by means of a head wheel carrying peripherally arranged magnetic heads, wherein the addresses of reproduced lines of picture information are derived solely from the composite signal reproduced from the magnetic tape, wherein useful lines are read into respective locations of a picture store in accordance with these line addresses, and wherein the stored lines are read out from the store in a predetermined sequence.

The present invention has the advantage that the line addresses are derived solely from the video signal. Consequently the capital outlay on mechanical devices and circuitry for the recognition and evaluation of the head wheel position and the tape position is avoided.

The method is suitable for use in all storage systems for television signals having a large number of separate tracks for the video information running obliquely to the longitudinal direction of the tape; it may be used with particular advantage in systems for the storage of television signals in which the content of a field is contained in more than one track.

The invention also provides an apparatus particularly suited for the practice of the invented method.

Figure 2:
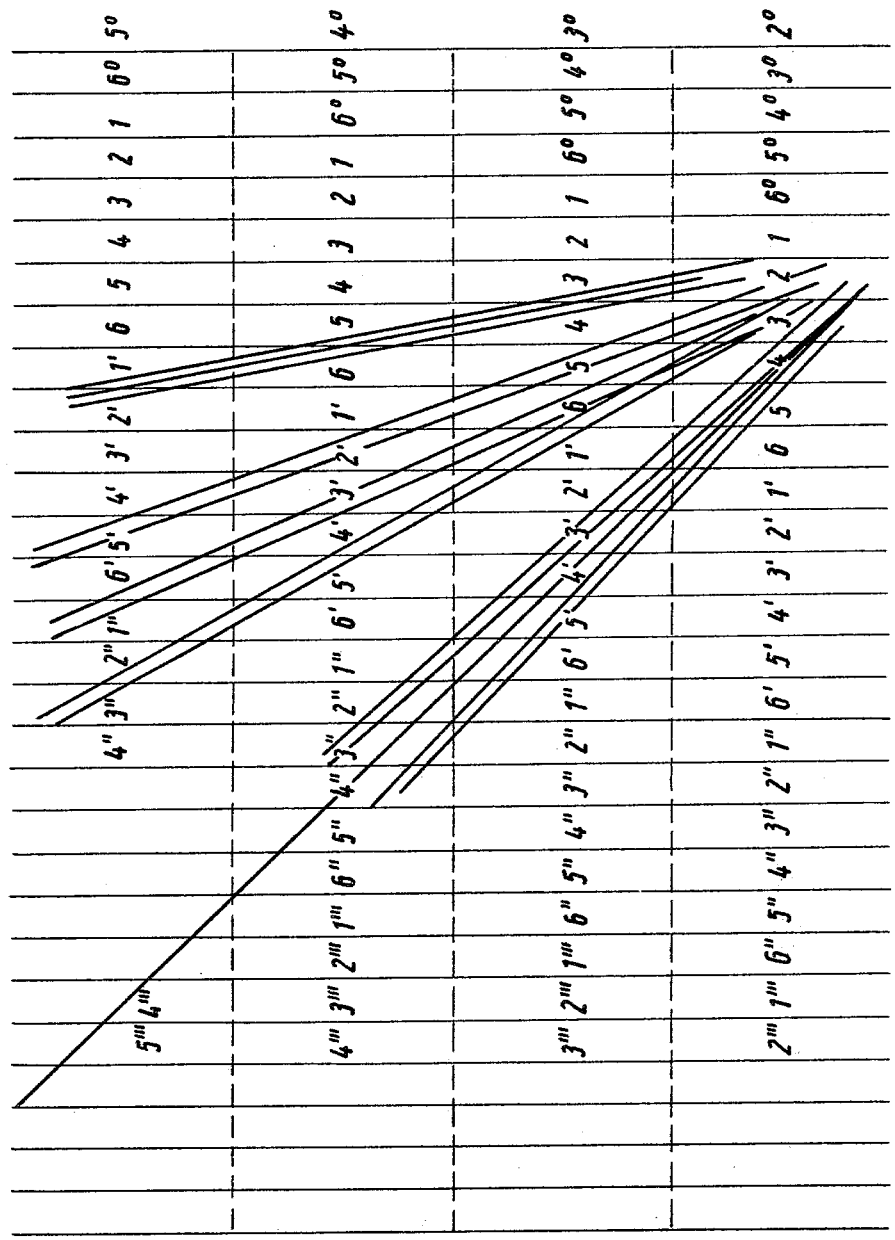
Figure 3:
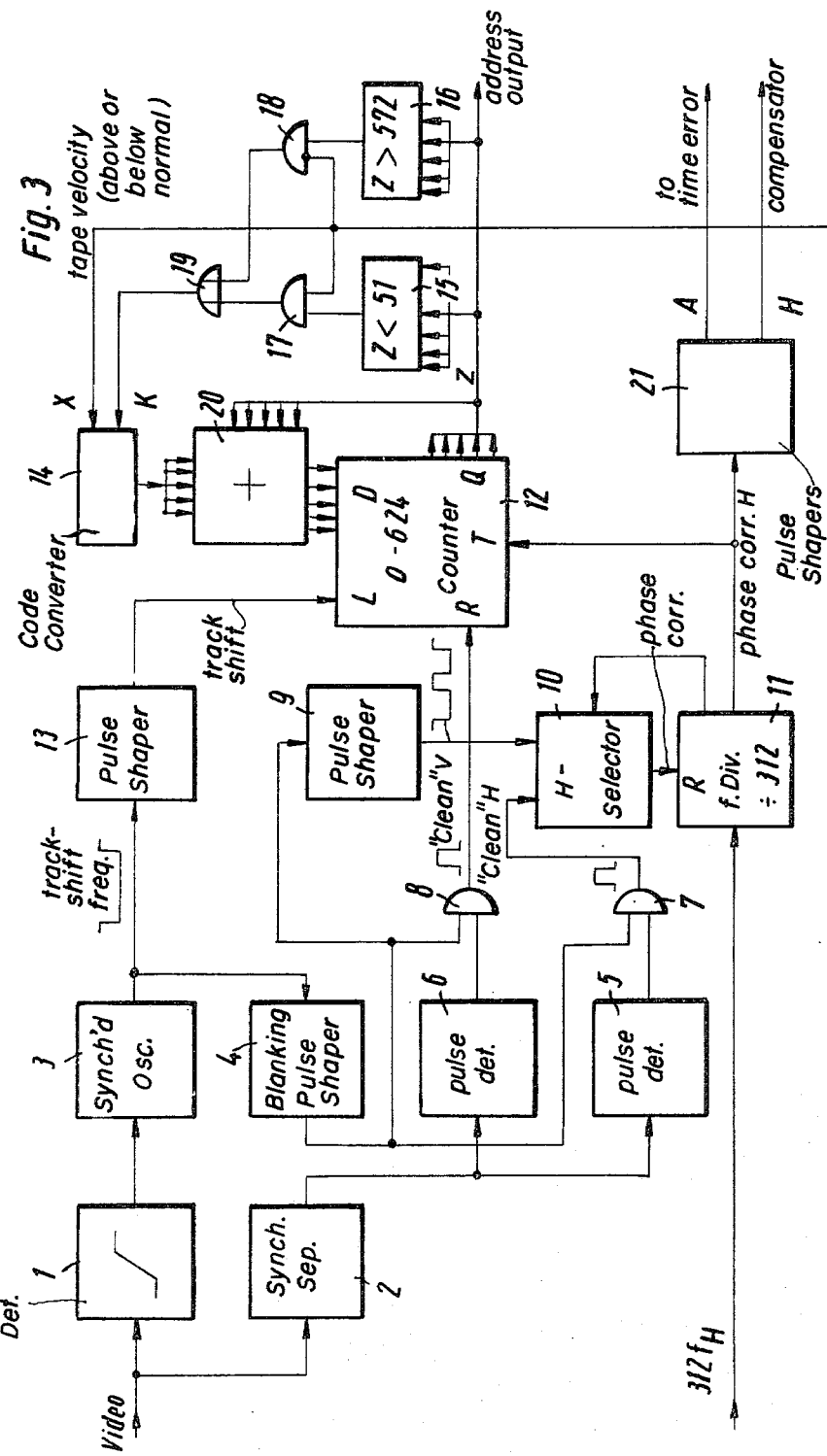

An embodiment of the invention will now be described, by way of example, with reference to the accompanying drawings, in which:

FIG. 1 is a schematic diagram of a typical track layout resulting from magnetic tape equipment of the kind to which the invention is applicable, FIG. 2 shows schematically the scanning paths on the tape for different tape speeds, and FIG. 3 is a block diagram illustrating an embodiment of the present invention.

In FIG. 1 a magnetic tape 10 contains video information in a series of tracks 1°, 2°, 3°, 4°, 5°, 1, 2, 3 ... 2', 3' etc. directed obliquely to the edge of the tape. Each track contains just over 52 picture lines. The contents of six tracks then correspond to a field composed of 312.5 lines, and 12 tracks produce a frame with 625 lines according to the European standard. In addition to the oblique tracks for the video information the magnetic tape 10 also contains a space for further tracks extending in the longitudinal direction of the tape.

The tracks 11 and 12 are intended for the storage of stereo sound information, and the track 13 contains, for example, the 4 V pulse used for identification purposes in the recording of video information according to the PAL standard. Finally track 14 may accommodate control instructions or other types of auxiliary signals, or else a further audio channel (external speech channel).

The diagram of FIG. 2 shows at X the tracks 1, 2, 3, 4, 5, 6 representing a field arranged in sequence in the vertical direction (only the first four tracks are shown in order to keep the figure to a reasonable size). After track 6 there follows track 1' of the next field, and thereafter 2', 3', and so on. The direction of the vertical line X therefore corresponds to the scanning operation at normal reproduction speed, wherein the tracks are scanned and reproduced over their full length successively in the sequence of their numbering. In order to explain the effect of scanning with a different tape speed further vertical lines are plotted to the right hand side and left hand side of the line X at equal intervals, these likewise containing tracks numbered in sequence, but increasing by one in progressing from the right to the left hand side. Thus to the left of track 1 in the vertical line X is track 2, and to the left of track 1' is track 2', and next to it track 3', and so on. In the right hand direction from the vertical line X the numbering reduces progressively, so that adjacent track 1 is track 6°, adjacent the latter is track 5°, and thereafter track 4° and so on. On the diagram a zero feeding speed of the magnetic tape (stationary tape) would correspond to a straight line which cyclically cuts the same succession of adjacent tracks always at the same position with respect to each track.

When operating at a tape speed which is an even multiple, for example twice, the recording speed, one of the magnetic heads (of which in the present case there are assumed to be two disposed 180° apart on opposite sides of the head wheel) begins scanning at the start of track 1 for example, the other head after a half revolution of the head wheel scans the start of track 3, and thereafter the first head scans the start of track 5, and so on. This corresponds in the diagram to a straight line proceeding from the beginning (bottom) of the track 1 at X towards the beginning of the track 3 and so on. Therefore, of the total information contained in the tracks 1 to 6 satisfactory reading out is effected only of those parts which are contained in the first few lines of each alternate track and the last few lines of the intervening tracks. Beyond that, the information contained in the remaining lengths of each track necessary for synthesising a complete field is lost. Consequently a complete television picture cannot be obtained.

However, from the diagram it is evident that, excluding tape reproducing speeds characterized by n times the normal (recording) speed and 1/n times the normal speed, n being a positive or a negative integer, tape speeds exist at which, after a limited number of scanning operations (head wheel revolutions) each track 1, 1′, 1″ and 2, 2′, 2″ etc., is scanned sufficiently frequently along different segments thereof that sufficient lines free of disturbance are read out at least once for providing the necessary number of lines for a complete field, such lines including at least one of each line number within a field although taken from different fields. There exists a constant ratio between the number of useful lines derived from each traverse of a magnetic head over a track and the entire segment of the respective track which is being scanned, and this ratio is independent of the tape speed which is selected.

It has proved to be advantageous, in the performance of the invention, if the reproduction speed for fast or slow motion is so selected that the picture synthesis evolves progressively from successive line groups which are read out without disturbance. For example, lines 1 to 4 of the synthesised picture can be derived from track 1, lines 5 to 8 from track 1′, which represents a portion of the information content of the next field, lines 9 to 12 from track 1″, and so on. A picture constituted in such a manner exhibits in reproduction the least edge aberrations of moving objects. Clearly a picture synthesis is also possible from line groups of descending numbering, that is to say for example lines 49 to 52 from track 1, lines 45 to 48 from track 1′, lines 42 to 45 from track 1″, and so on.

For the synthesis of a coherent complete field from a plurality of line groups which belong to various preceding fields, it is necessary that the following two things be determined:

1. Which lines of those read out as a magnetic head traverses a track provide useful picture information, and
2. the addresses which are assigned to these lines, the address identifying the geometrical position of a line in the picture.

To determine 1:

For the occurrence of disturbed (non-usable) lines the criterion which is adopted in the present embodiment is the appearance of cross modulation in the demodulated signal in the transition of a magnetic head from one track to the next track. It has been established that the level of this disturbance modulation is considerably greater than the level of the useful signal. Thus the level of the cross modulation rises in the positive direction above the level of the picture content and also moves in the negative direction below the base of the synchronizing signal.

The signal is therefore clamped, for example, and the signal components which lie below the synchronizing base are excised, and this condition is used for detecting that (a) a recorded track has been left, and (b) those lines which include these signal components are disturbed lines.

This permits a substantially more reliable discrimination between the acceptable and disturbed lines than is possible merely by recognising the interruption of the carrier frequency upon transition from one track to the next. A further possibility for detecting the transition from one track to the next track is offered by the consequential phase shift which occurs at that time in the horizontal synchronizing signal. This takes place during the scanning of a track in a fixed sequence at a definite scanning speed. During reproduction at the same tape speed as used in the recording the pulses of the horizontal synchronizing signal occur at regular fixed intervals. When reproducing at a different tape speed from that used in the recording, however, the phase shift referred to above occurs when a magnetic head crosses over from one track to another.

For the purpose of increasing the reliability of detecting cross modulation a synchronizing "flywheel" oscillator is used in the embodiment described below, which makes possible the counting of undisturbed lines and the blanking out of the lines disturbed by the scanning. Moreover this arrangement ensures the production of an undisturbed picture in the case where it may happen that a disturbed line is nevertheless erroneously recognized as satisfactory or, conversely, where a satisfactory line is not adopted in the picture synthesis.

Groups of undisturbed lines and those affected by cross modulation succeed each other at the frequency of crossing tracks, and since this frequency varies with the tape reproduction speed the time constant of the flywheel circuit must also be varied according to tape speed.

Condition 2:

According to the invention the line addresses are derived solely from the signal mixture reproduced from the tape. In this embodiment, the horizontal (H) and vertical (V) frequency synchronizing pulses, and the cross modulations arising upon transfer of the magnetic head from one track to the next, are separated from the signal mixture taken from the tape and, after a suitable pulse forming operation, are delivered to a counter having a storage capacity corresponding at least to the number of lines of a frame. In principle this line counter is reset by each V pulse, each H pulse causes an increase or a decrease in the count conditions by "1" according to the deviation of the tape motion from the normal speed, and each pulse caused by cross modulation causes an increase or a decrease in the count condition by an amount which corresponds to the number of lines of a television picture recorded in an individual track. This will be described in detail later, as will be the circuit measures provided for the case where the count condition permits an overrun, and for removing disturbance from the pulse series taken from the tape.

Generally stated, a pulse series is required which makes it possible to determine with sufficient accuracy the local position of the magnetic head with reference to the transverse dimension of the magnetic tape. By this means it is possible to determine the position of the currently reproduced line within the track being scanned. For determining which track is being scanned the pulse sequence derived from the cross modulation is used. As already stated, this cross modulation appears each time when crossing over from one track to the adjacent track. With these two pieces of information, the line position within the scanned track and the track being scanned, it is possible to allocate a unique address to the line defining its position in the reproduced picture.

In the practical embodiment of a circuit arrangement for performing the invention according to FIG. 3, the signal mixture taken from the magnetic tape is delivered to an amplitude discriminator 1 which recognises and separates the excess level resulting from the appearance of cross modulation. At the same time the signal mixture is delivered to a synchronizing pulse separation stage 2. For the purpose of suppressing any excess level which may be present, for example in consequence of cross modulation not caused by the transfer from one track to another, the pulse series from the output of the amplitude discriminator 1 is delivered to a flywheel circuit 3, the variable time constant of which is so selected in dependence upon the tape reproduction speed that at the output thereof a series of negative-going pulses is available at the track crossing frequency. As already described above the cross modulation which occurs upon track transfer or crossing attains amplitudes which may correspond to or exceed those of the synchronizing signals.

For distinguishing the horizontal and vertical synchronizing pulses the output of the synchronizing pulse separation stage 2 is connected to the input of an H detection circuit 5 and a V detection circuit 6. The pulse series at the output of H detection circuit 5 is still in an unfinished state, that is to say it is accompanied by pulses which originate from the occurrence of cross modulation. For the purpose of obtaining disturbance-free synchronizing signals, the pulse series from the output of the flywheel circuit 3 passes through a blanking pulse former stage 4, the negative-going output signal of which corresponds to the time duration of the moiré disturbance. The H pulse series is then delivered to the input of a logic circuit 7 (AND gate), the other input of which is connected to the output of the blanking pulse former stage 4. The level at the output of the logic circuit 7 will be zero when the H pulses originate during cross modulation. In a similar manner the output of the V detection circuit 6 is connected to one input of a logic circuit 8 (AND gate), whilst the other input of the gate receives pulses from the blanking pulse former stage 4. At the output of the logic circuits 7 and 8 there are therefore available horizontal and vertical frequency pulse series derived from the magnetic tape which are free from disturbing signals, but which are discontinuous owing to the missing moiré disturbed pulses. The output of the blanking pulse former stage 4 is connected to the input of a further pulse former stage 9.

At the output of the pulse former stage 9 there is a train of pulses each having a width dependent upon the time duration of the moiré disturbance, and having approximately in the middle of each pulse a narrow pulse of opposing (positive-going) polarity, which pulse train is delivered to one input of an H selection stage 10. The second input of the H selection stage 10 is connected to the output of the logic circuit 7 and therefore receives the discontinuous H frequency pulse series freed from cross modulation disturbances.

The pulse train at the output of the pulse former stage 9 and the H frequency pulse train from the output of the logic circuit 7 are processed in the H selection stage 10 in such a manner that each time after the appearance of a moiré disturbance the first useful H synchronous pulse is available with its phase already corrected at the output of the circuit 10. This signal is delivered to the reset input of the divider 11, whose clock frequency, of 312 times the horizontal frequency $f_H$, is synchronized by the irregular sequence of pulses appearing at the output of the circuit 10. At the output of the 312 divider there therefore appears a continuous pulse series corresponding to the horizontal synchronizing signals taken from the magnetic tape.

The middle pulse at the output of the pulse former stage 9 has such an effect in the circuit 10 that the phase shift of the horizontal synchronizing signals caused by the transfer from one track to the adjacent track is located substantially in the centre between the two tracks and, because it is situated in the region of the moiré disturbed H pulses, it is suppressed in respect of the subsequent portion of the circuit.

A counter 12 is provided which possesses a counting capacity corresponding at least to the number of lines corresponding to a frame. The clock pulse input of this counter is connected to the output of the divider 11 and therefore receives H frequency pulses in continuous sequence corresponding to the horizontal synchronizing pulses taken from the magnetic tape. The resetting input of the counter 12 is reset by the V frequency pulses from the output of the logic circuit 8. The L input of the counter 12 is connected to the output of a further pulse former stage 13, which generates pulses corresponding to the appearance of moiré disturbances in response to its input pulse former stage 13 is therefore connected to the output of the flywheel circuit 3. A pulse at the L input of the counter 12 causes a change in the count condition by differing magnitudes according to the instantaneous count condition and logic information dependent upon the tape speed will now be explained.

In order that a pulse at the L input can be evaluated with the correct sign corresponding to the effective tape speed, which can either be greater or less than the normal speed, a code converter 14 is arranged to receive at its X input speed information from a speed selector switch in such a form that, in the case of a tape speed which is greater than the normal speed a low logic level is received, and in the case of tape speeds which are smaller than the normal speed, including reverse motion of the magnetic tape, a high logic level is received. The code converter 14 also receives a high or low level at its K input, from the Q outputs of the counter 12 via the two count condition detection circuits 15 and 16 and the logic circuits 17, 18 and 19, depending upon whether the count condition circuits 15 or 16 indicate or do not indicate an impending overrun of the counter 12. In a practical embodiment the counter 12 is a store having a capacity of 4096 bits. In order to ensure correct switching over in the event of an overrun of the counter above the count condition 624, or upon reverse counting below zero, the arrangement of the count condition detection circuits 15 and 16 and the logic elements 17, 18 and 19 is devised according to the following function table:

| Count Condition | Output 15 | Output 16 | X | K | Output 14 |
|---|---|---|---|---|---|
| Z < 51 | O | O | O | O | 52 |
| Z > 572 | O | L | O | L | 3523 = 4096−(625−52) |
| Z = 52−572 | L | O | O | O | 52 |
| Z = 52−572 | O | O | L | O | 4045 = 4096−51 |
| Z > 572 | O | L | L | O | 4045 = 4096−51 |
| Z < 51 | L | O | L | L | 574 = 625−51 |

At a tape speed greater than normal speed and if no count condition overrun is imminent the count condition increases by 52 upon the appearance of a pulse at the L input of the counter 12. If the count condition detection circuit 16 indicates a count condition greater than 572 then, upon the subsequent pulse at the L input of counter 12, the count condition increases by 3523 corresponding to 4096-(625-52). On the other hand if the tape speed is smaller than normal and therefore a constant high level applies at the X input of the code converter 14, then at each pulse at the L input 4045 is added to the count condition corresponding to the subtraction 4096-51. If with this mode of operation the count condition indicator 15 indicates a count condition less than 51, then at the K input of the code converter 14 there is again a high level pulse which, upon appearance of a pulse at the L input of the counter 12, results in an addition of 574 to the count condition corresponding to the subtraction 625-51.

The data outputs of the code converter 14 are connected to one group of data inputs of a parallel adder 20, and the second group of data inputs of the parallel adder 20 are connected to the Q data outputs of the counter 12. The outputs of the parallel adder 20 are connected to the data inputs of the counter 12 indicated by D.

Each pulse at the L input of the counter 12 causes an increase in the count condition by the amount corresponding to the number of lines of a track segment (i.e. 52).

Dependent upon the information appearing at the output of the parallel adder 20, the counter 12 counts forwards or backwards. By complement formation in forward counting overrunning is prevented, and similarly when performing reverse counting, corresponding to effective tape speeds less than normal speed, such reverse counting takes place with continuous complement formation. The final result is that the count condition of the counter 12 at any time corresponds to the address of the currently scanned line of the television signal taken from the magnetic tape. The line addresses Z of the Q outputs of the counter 12 are delivered to the address inputs of a temporary picture store (not shown in the drawing) into which the useful lines are stored.

The H frequency pulses derived from the output of the 312 divider 11 are delivered to a blanking signal and H synchronizing signal former 21 the two outputs of which respectively receive a blanking signal A and a synchronizing signal H, which can serve as reference signals for a time error compensator.

It will of course be appreciated that the foregoing has dealt in detail only with the address allocation circuitry. This is because the other elements required to perform the invention, i.e. the helical scan equipment itself, the means for providing different tape reproduction speeds, the means for evaluating those lines which contain useful picture information and the temporary picture store into which the useful lines are read according to their addresses and from which the lines are read out according to the desired television standard, are either well known in the art and may be entirely conventional, or may be as described in the aforementioned prior patent application. It is therefore not deemed necessary to deal with these aspects in detail in the present specification.

We claim:

1. A method of reproducing, at a selectable magnetic tape speed different from that used in recording, a video signal recorded on a tape in a multiplicity of separate parallel tracks, each containing only a fraction of the total number of picture lines making up a television field and obliquely directed across the tape, the reproducing method being performed with a head wheel carrying peripherally arranged magnetic pick-up heads scanning across the tape as the tape is advanced in such a way as to follow the recorded tracks with substantial accuracy in normal sequence when the tape is moved at the speed used in recording, so that at other playback speeds portions of the picked up signals are subject to cross-modulation moiré disturbances and amplitude variations as the active pick-up head shifts off one track and onto another, said method comprising the steps of:

generating a sequence of pulses at the frequency at which the active pick-up head shifts from one track to an adjacent track and synchronizing said track-shift pulses in frequency and phase by detected cross-modulation amplitude variations picked up by the active pick-up head;

generating a sequence of pulses at the picked-up horizontal synchronizing pulse frequency and substantially in phase with the picked up horizontal synchronizing pulses;

producing an uninterrupted series of horizontal synchronizing pulses by blanking any pick-up of horizontal synchronizing pulses during a gated interval derived from said track-shift pulses, while utilizing the unblanked picked-up horizontal synchronizing pulses to correct the phase of said generated horizontal synchronizing frequency pulses, thereby making available substitute pulses for utilization during blanking intervals;

counting the pulses of said uninterrupted series of horizontal synchronizing pulses in a counter;

detecting picked-up vertical synchronizing pulses and resetting said counter with each detected vertical synchronizing pulse;

determining the value and sign of a numerical alteration of the content of said counter necessary at the time of appearance of a track-shift pulse in order to enable the counter content to continue to represent the address of each picked-up horizontal line with reference to a television picture;

using a pulse derived from each said track-shift pulse to enable the content of said counter to be altered by said numerical value and sign;

storing picked-up video signal lines individually for a period of a plurality of picture fields;

utilizing the content of said counter to provide an address for each stored individual video signal line;

reproducing a picture from stored lines picked up over a plurality of field periods by reproducing the lines in a sequence determined by the addresses provided for the stored lines by the content of said counter.

2. A method as defined in claim 1, in which there is also provided the step of preventing the storage of lines containing disturbed video signals by means of a gate pulse derived from said sequence of track-shift pulses.

3. A method as defined in claim 1, in which the step of using a pulse derived from a track-shift pulse to enable the counter content to be altered is performed by algebraically adding the value of the counter content to said numerical alteration value and substituting the algebraic sum so obtained for the previous content of the counter in response to a track-shift pulse.

4. A method as defined in claim 1, in which the step of determining the value and sign of a numerical alteration to be made to the content of said counter is deformed by the substeps of determining whether the content of the counter is less than the number of lines in one track or differs from the total number of lines in a television picture by less than the number of lines in one track, performing a code conversion in response to each of such determinations and adding algebraically in a parallel adder the content of said counter to a number determined by the code conversion for loading into the counter upon the arrival of a track-shift pulse.

5. A method as defined in claim 4, in which said number algebraically added in said parallel adder to said counter content is, according to the determination step of the magnitude range of the content of said counter, either the number of lines in a track or a complement of said number of lines or a complement of one less than said number of lines.

6. A method as defined in claim 4, in which said code converting substep takes account of whether the tape is moving at greater or less velocity than the recording speed, all reverse velocities being treated as less than a normal velocity corresponding to the recording speed.

7. A method as defined in claim 6, in which the number added algebraically in said parallel adder to the content of said counter conforms to the table given below in which the quantity A is an odd integer representing the total number of lines in a picture, the quantity, B represents the number of lines in a track, B' represents one less than the number of lines in a track, B" represents one more than the number of lines in a track, and C represents the highest number that can be registered in the counter:

| Counter Content | Tape Velocity | Addition to Content |
| --- | --- | --- |
| <B' | >normal | B |
| >A−B" | >normal | C−A+B |
| anywhere from B' to A−B" inclusive | >normal | B |
| " | <normal | C−B' |
| >A−B" | <normal | C−B' |
| <B' | <normal | A−B' |

8. In an apparatus for reproducing, at a selectable magnetic tape speed different from that used in recording, a video signal recorded on a tape in a multiplicity of separate parallel tracks, each containing only a fraction of the total number of picture lines making up a television field and obliquely directed across the tape, the reproducing being performed with a head wheel carrying peripherally arranged magnetic pick-up heads scanning across the tape as the tape is advanced in such a way as to follow the recorded tracks with substantial accuracy in normal sequence when the tape is moved at the speed used in recording, so that at other playback speeds portions of the picked up signals are subject to moiré disturbances and cross-modulation amplitude variations as the active pick-up head shifts off one track and onto another, a combination of electrical components connected in circuit for providing addresses representative of position in a picture for each picture line from which video signals are picked up, comprising:
means for detecting cross-modulation effects resulting from pick-up head track-shift;
means for generating a sequence of pulses at the frequency at which the active pick-up head shifts from one track to an adjacent track and for synchronizing said track-shift pulses in frequency and phase by the output of said detecting means;
means for generating a sequence of pulses at the picked-up horizontal synchronizing pulse frequency and substantially in phase with the picked up horizontal synchronizing pulses;
means for producing an uninterrupted series of horizontal synchronizing pulses by blanking any pick-up of horizontal synchronizing pulses during a gated interval derived from said track-shift pulses, while utilizing the unblanked picked-up horizontal synchronizing pulses to correct the phase of said generated horizontal synchronizing frequency pulses, thereby making available substitute pulses for utilization during blanking intervals;
a counter for counting the pulses of said uninterrupted series of horizontal synchronizing pulses;
means for detecting picked-up vertical synchronizing pulses and resetting said counter with each detected vertical synchronizing pulse;
means for determining the value and sign of a numerical alteration of the content of said counter necessary at the time of appearance of a track-shift pulse in order to enable the counter content to continue to represent the address of each picked-up horizontal line with reference to a television picture;
means for enabling the content of said counter to be altered by said numerical value and sign upon the occurrence of each track-shift pulse;
whereby the content of said counter serves to provide an address for each individual video signal line picked up during the pick-up thereof.

9. A circuit combination as defined in claim 8, in which said means for detecting cross-modulation effects is an amplitude discriminator.

10. A circuit combination as defined in claim 9, in which said means for detecting cross-modulation effects is an amplitude discriminator confined in time to the horizontal synchronizing pulse pedestal portion of television signals.

11. A circuit combination as defined in claim 8, in which said numerical alteration determining means comprises circuits for respectively recognizing two count conditions of the content of said counter, means for providing an electrical signal having one value when the tape speed is above the recording speed and another when it is below the recording speed, all reverse speeds being regarded as below recording speed, and code conversion means responsive to said electrical signal and to the outputs of said count condition recognition circuits.

12. A circuit combination as defined in claim 11, in which said counter content alteration enabling means includes means for adding a numer represented by the output of said code conversion means to a number equal to the content of said counter and means for causing the output of said adding means to be made the content of said counter in response to a track-shift pulse.

* * * * *